Patented Mar. 10, 1942

2,275,630

UNITED STATES PATENT OFFICE 2,275,630

WAX POWDER REFINING

Herbert F. Johnson, Jr., Caledonia, and John Vernon Steinle and Robert P. Gardiner, Racine, Wis., assignors to S. C. Johnson & Son, Inc., Racine, Wis., a corporation of Wisconsin No Drawing. Application July 17, 1939, Serial No. 284,886

9 Claims. (Cl. 210—150.5)

This invention relates to the manufacture of raw material wax and deals, more specifically, with a process for removing non-waxy matter from crude vegetable wax powder.

Many vegetable waxes such as esparto grass wax, sugar cane wax, carnauba wax and ouricury wax are removed from the plant fibers by mechanical means and are therefore in the form of a crude wax powder containing leafy vegetable matter and other non-waxy matter. In order to simplify the explanation of the problems here solved, a brief introduction to the methods presently employed in manufacturing raw material wax cakes from the crude powder is illustrated with the typical commercially available carnauba wax. The production of the raw material wax cakes from the crude powder takes place at the source of the powder which, in the case of carnauba wax, is limited to the relatively small area of Brazil in and surrounding the States of Ceara and Piauhy.

The natives cut the leaves from the carnauba palm and allow them to dry in open fields. During this drying, which takes about three days under an intensely hot sun, the shrinking of the leaves loosens the wax from the surface, but the wax largely remains enclosed within the crevices of the thoroughly dry and brittle shrunken leaves. These leaves are carried into small sheds where the fine crystalline-like flakes of wax powder are removed by slitting the long leaves and manually beating them in suspended position with a stick. The wax powder drops to the floor and contains a large amount of leafy matter of which the greater portion is also in the powdered form of particle size, shape and mass comparable to that of the wax powder from which it can scarcely be distinguished. The total non-waxy material in this crude powder may comprise as much as 20% of its total mass.

The next step, as practiced by the natives, comprises melting the crude powder in cans over an open fire and straining the molten mass through a cloth to remove the leafy matter and other solids which are insoluble in the molten wax. The cooled filtrate forms the dark grey, greenish-brown or brownish-black raw material carnauba wax cakes of commerce.

In this specification and in the following claims, we use the term wax powder to identify the powdery substance which is removed as such from the vegetable matter and which is composed of both wax and non-waxy particles. The term crude powder refers to the wax powder prior to any removal of the fine non-waxy material, and the term raw material wax refers to the solid wax cakes which are manufactured from the wax powder.

Raw material wax, such as carnauba wax, is highly colored and its commercial use necessitates the refinement of the wax primarily for the purpose of decreasing its coloration, but also in some instances for the purpose of removing non-waxy matter and increasing the uniformity of the wax composition.

Many processes have been proposed to obtain the above results. One large group of these processes employs adsorbents and produces a product of unaltered wax components, but the decolorizing thereby effected has not proven entirely satisfactory. These processes require a re-melting of the raw material wax cakes and have proven costly by virtue of the large amounts of wax retained in the adsorbent.

Another large group of processes, which also require a re-melting of the raw material wax cakes, employs chemical means to effect a bleaching of the wax. The products of these processes are of satisfactory lightness of color, but the chemical action which is sufficient to bleach the wax will also change the chemical and structural nature of the wax components to an extent which prohibits the use of these products as a wax in many commercial manufactures.

To recapitulate, the light colored wax which has been obtained from the raw material wax by means of chemical bleaching contains chemically and/or structurally altered wax components, and the chemically and structurally unaltered wax which has been obtained from the raw material wax by means of adsorbent decolorizing methods is not entirely satisfactory in lightness of color and is obtained only at considerable cost.

An object of our invention is to obtain a raw material wax of satisfactory lightness of color. Another object of our invention is to obtain a raw material wax from crude powder which wax is of satisfactory lightness of color, of uniform composition, and contains the chemically and structurally unaltered original wax components. It is still another object of our invention to provide mechanical means for separating non-waxy matter in the crude vegetable wax powder from the wax particles. Still another object of our invention is to manufacture a light colored raw material wax using the crude wax powder as the initial material.

This invention turns on the discovery of the nature and cause of the coloration in the raw material wax. In order that this discovery may be appreciated, it is believed desirable to examine the coloration from a theoretical standpoint.

It has long been recognized that the coloration of the raw material wax depends upon the age of the leaves from which the wax is obtained. For example, the wax obtained from the "palhas," or open carnauba leaves, is of a very dark color, whereas the wax obtained from the "olhos," or young unopened carnauba leaves, is of a very light yellow color. We have discovered by experimentation that the wax formed by melting the very small pure wax particles obtained from the old or the young leaves is practically colorless and that the greatly differing color of the raw material wax which is prepared from the crude wax powder obtained from these different leaves must be introduced during the manufacture of the raw material wax. Following this line of reasoning, we further discovered that the coloration is introduced during the melting of the crude wax powder. Part of this coloration is obtained from sources other than the leafy matter, such as sand, clay, dirt and humus material, but this coloration can readily be satisfactorily removed from the wax cake by means of subsequent remelting and filtration. The leafy matter, however, contains difficultly removable high coloring substances, such as chlorophyll and xanthophyll, which, together with their decomposition products and the decomposition products of other color-forming substances, are extracted by the hot molten wax to form the greater part of the undesirable deep coloration of the crude raw material wax cakes. This coloration is thereby so thoroughly incorporated within the wax that its subsequent complete removal has not been attained by any known process whereby the product produced retains the components of the original wax unchanged.

The unopened yellow "olhos" leaves therefore produce the yellow colored wax because the leafy material in the crude powder obtained therefrom contains no chlorophyll or other deep coloring substances incident to the more mature open leaves, and the hot molten wax extracts only the light yellow coloration composed largely of carotin. Crude powder which is obtained from the green opened "palhas" leaves contains the fine leafy matter beaten from these leaves whereby the deep coloring substances, such as chlorophyll and xanthophyll, are introduced into the powder and are subsequently extracted by the hot molten wax to form the deep-coloration of the raw material wax cakes.

Contrary to the teachings of the prior art, we have discovered that the coloration of wax is not dependent on the living plant leaves or the age thereof; that the coloration is incorporated into the wax during the melting of the crude powder; and that a substantial reduction of the leafy matter in the crude powder prior to its initial melting will result in a lighter colored raw material wax. This reduction of leafy matter prior to melting reduces to that extent the source of the coloring matter which is otherwise extracted by the hot molten wax and constitutes a novel approach to the problem of manufacturing a lighter colored raw material wax.

The amount of leafy matter in the crude wax powder is reduced by means of screening and air flotation separations. Substantial screening of the crude powder will of itself improve the color and quality of the raw material wax cake and air flotation separation alone will likewise improve such color and quality. Although either type of the above separations will of itself give improved results, we have found that the combination of both screening and air flotation separations provides the maximum mechanical separation of non-waxy matter from the wax particles and is therefore the preferred process.

Maximum screening separation in practice is obtained by successively screening the crude powder through two or more screens of increasing fineness of mesh. The first screen may be from 20 to 30 mesh per inch and the last screen of about 60 mesh per inch. A finer mesh than 60 per inch cannot be used with ordinary crude carnauba wax powder without losing appreciable quantities of wax in the tailings of the screening operation. Screens of the type which employ a lateral motion with respect to the screening surface, or which cause the powder to move across the screening surface, are preferred.

The screened powder is subsequently subjected to the air flotation separation. We prefer to use that type of separator which employs a centrifugal flow of air wherein the velocity of the air is adjusted to effect the separation of the fine leafy material from particles of the size, shape and mass of the wax powder particles. This removal of the leafy matter is dependent upon the difference in the morphology of leafy matter as compared with the wax particles rather than upon any difference in their specific gravities. The sand, clay and dirt is removed in this operation solely on the basis of greater mass.

The fines, or purified wax powder, obtained from the air flotation separator is then melted and filtered to remove any remaining solid impurities and the filtrate, upon cooling, produces a raw material wax cake of satisfactory composition and lightness of color for most commercial purposes. This wax cake retains unchanged the original components of the wax.

The reduction of the leafy matter also facilitates the filtration of the molten wax and reduces the loss or cost of recovering the wax which is otherwise retained in the large amount of vegetable residue remaining in the filter press.

*Example 1*

Crude carnauba wax powder is successively screened through a screen of about 30 mesh per inch followed by another screen of about 60 mesh per inch. The screens which impart a motion to the powder across the screening surface are preferred. The fines obtained from the screening operation are melted and filtered to remove the remaining non-waxy matter, and the filtrate, upon cooling, forms light colored raw material wax.

*Example 2*

Crude carnauba wax powder is subjected to a centrifugal air flotation separation in a Raymond centrifugal air-flow type separator which has two or more banks of whizzer blades. This separator having a single bank of whizzer blades is described in United States Patent No. 1,783,357. The flow of air is adjusted to such a velocity that the wax powder particles are barely carried along with it and out of the zone of the whizzer blades. The fines of this separation are treated as in Example 1.

*Example 3*

Crude carnauba wax powder is screened through a screen of about 30 mesh per inch and the fines thereof are again screened through a screen of about 60 mesh per inch in a screener which imparts a motion to the powder across the surface of the screen. Screeners of the "Gyro Whip" or "Abbe" types are suitable for this purpose. The "Gyro Whip" type screener is described in United States Patent No. 2,159,549 and the Abbe type screener is described on page 6 of Bulletin No. 42 published by the Abbe Engineering Company of New York. The fines of the screening separation are subjected to a centrifugal air flotation separation in a Raymond separator. The refined wax powder is melted and filtered and the filtrate, upon cooling, forms a light colored raw material wax of uniform composition.

This process for purifying crude vegetable wax powder by mechanical means has not been employed in any process known to the authors for purifying wax powder and, although its application has been set forth with reference to carnauba wax powder, no limitation is hereby imposed upon the process in that it is generally applicable to all vegetable waxes which are obtained from the plant fibers in the form of a powder.

It is evident that our invention offers many advantages over prior methods for processing crude wax powder to form raw material wax cakes. It is highly flexible and may be carried out in many ways without departing from the spirit or scope of our invention which is not to be regarded by the details of operation or by the theories advanced in the explanation of the improved results obtained, but only by the terms of the accompanying claims in which it is our intention to claim all novelty inherent therein as broadly as possible in view of the prior art.

Having thus described the invention, what we claim as new and desire to secure by Letters Patent of the United States, is:

1. In the manufacture of wax from crude vegetable wax powder which has not been melted in the production thereof, the process which comprises screening the said crude vegetable wax powder through one or more screens of about 40 to 60 mesh prior to its initial melting to remove fine leafy and other non-waxy material.

2. In the manufacture of wax from crude carnauba wax powder which has not been melted in the production thereof, the process which comprises screening the said crude carnauba wax powder through screens of about 40 to 60 mesh prior to its initial melting to remove fine leafy material and other non-waxy matter.

3. In the manufacture of wax from crude vegetable wax powder which has not been melted in the production thereof, the step which comprises mechanically removing from the said wax powder a substantial portion of its non-wax constituent of powder particle size prior to the initial melting of the powder.

4. In the process of purifying crude vegetable wax powder which has not been melted in the production thereof, the method which comprises subjecting the said crude wax powder to a centrifugal air flotation separation and thereby removing leafy and other non-wax materials of powder size particles from the wax particles.

5. The hereinbefore described method of purifying crude vegetable wax powder which has not been melted in the production thereof, comprising screening the said crude wax powder through screens of about from 40 to 60 mesh, subjecting the fines of the screening operation which contain the wax to a centrifugal air flotation separation, and thereby removing leafy and other non-wax matter of powder size particles from the wax particles.

6. The herein described method of manufacturing raw material wax from crude vegetable wax which has not been melted in the production thereof, comprising screening the said crude wax powder through screens of about from 40 to 60 mesh, subjecting the fines of the screening operation which contain the wax to further separation in a centrifugal air flotation separator, melting the purified powder which is carried from the separator by the air current, filtering, and cooling the molten wax filtrate to form light colored raw material wax.

7. In the process of purifying crude carnauba wax powder which has not been melted in the production thereof, the method which comprises subjecting the said crude carnauba wax powder to a centrifugal air flotation separation and thereby removing leafy and other non-wax material of powder size particles from the wax particles.

8. The herein described method of purifying crude carnauba wax powder which has not been melted in the production thereof, comprising screening the said crude wax powder through screens of about from 40 to 60 mesh, subjecting the fines of the screening operation which contain the wax to a centrifugal air flotation separation and thereby removing leafy and other non-wax materials of powder size particles from the wax particles.

9. The herein described method of manufacturing raw material carnauba wax from crude carnauba wax powder which has not been melted in the production thereof, comprising screening the said crude carnauba wax powder through screens of about 40 to 60 mesh, subjecting the fines of the screening operation which contain the wax to further separation in a centrifugal air flotation separator thereby removing leafy matter of powder size particles from the wax particles, melting the purified powder which passes from the separator with the air current, filtering, and cooling the molten wax filtrate to form the light colored raw material carnauba wax.

HERBERT F. JOHNSON, JR.
JOHN VERNON STEINLE.
ROBERT P. GARDINER.